United States Patent [19]
Ikegaya et al.

[11] Patent Number: 6,019,492
[45] Date of Patent: Feb. 1, 2000

[54] VEHICLE LAMP WITH A TRANSPARENT COVERING

[75] Inventors: Hiroki Ikegaya; Yoshimasa Goto, both of Shizuoka, Japan

[73] Assignee: Koito Manufacturing Co., Ltd., Tokyo, Japan

[21] Appl. No.: 08/953,412

[22] Filed: Oct. 17, 1997

[30] Foreign Application Priority Data

Oct. 17, 1996 [JP] Japan .................................. 8-295673

[51] Int. Cl.[7] ................................................ B06Q 1/04
[52] U.S. Cl. ..................... 362/521; 362/351; 362/328; 362/516; 362/517; 362/518; 362/520; 362/541; 362/308
[58] Field of Search .................... 362/516, 517, 362/518, 520, 521, 307, 308, 327, 328, 329, 541, 351

[56] References Cited

U.S. PATENT DOCUMENTS

| | | |
|---|---|---|
| 4,241,388 | 12/1980 | Green ........................................ 362/268 |
| 4,383,290 | 5/1983 | Binder et al. ............................. 362/290 |
| 4,733,336 | 3/1988 | Skogler et al. ........................... 362/142 |
| 5,084,805 | 1/1992 | Goto ............................................ 362/61 |
| 5,260,856 | 11/1993 | Perthus et al. ............................. 362/61 |
| 5,287,101 | 2/1994 | Serizawa ............................. 340/815.76 |
| 5,552,969 | 9/1996 | Murakami ................................. 362/61 |
| 5,692,824 | 12/1997 | Ooishi ....................................... 362/80 |
| 5,879,073 | 3/1999 | Hori et al. ............................... 362/344 |

*Primary Examiner*—Sandra O'Shea
*Assistant Examiner*—John A. Ward
*Attorney, Agent, or Firm*—Morgan, Lewis & Bockius LLP

[57] ABSTRACT

A vehicle lamp that looks attractive, whether the lamp is on or off, has a transparent cap attached to a reflector having a plurality of reflective surface elements. The transparent cap is attached to the reflector so as to cover the light bulb. A plurality of pillars are provided near the front end portion of the transparent cap for intercepting light emitted from the light bulb. On the front surface of these pillars are formed reflective surfaces. When the lamp is turned off, both the reflective surfaces of the reflector and the pillars glitter. When the lamp is turned on, the spaces between the pillars on the front end portion of the transparent cap shine.

14 Claims, 5 Drawing Sheets

VEHICLE LAMP WITH A TRANSPARENT COVERING

This Application claims a right of priority under 35 U.S.C. § 119(a), based on Japanese Patent/Application No. Hei 8-295673 filed Oct. 17, 1996, which is hereby incorporated by reference.

FIELD OF THE INVENTION

This invention relates to vehicle lamps such as backup lamps and turn signal lamps.

BACKGROUND OF THE INVENTION

An example of a vehicle lamp has a reflector with a plurality of reflecting elements. In the case of a backup lamp or turn signal lamp, a transparent cap covering the bulb is attached to the aforementioned reflector.

The provision of the transparent cap provides several effects. Lens steps are formed in the portion of the transparent cap which is located in front of the bulb, so that the lens steps refract the direct light beam emitted forwardly from the bulb. In this case the direct light beam may be utilized as lamp light distribution. In addition, the transparent cap may be colored (for instance an amber transparent cap). In this case, even if the lens is colorless and transparent, a colored light beam is obtained by virtue of the transparent cap. Hence, the interior of the lamp can be well seen through the lens, whereby the lamp feels deep. The vehicle lamp with the transparent cap does not have a good external appearance for the following reasons.

In general, the reflector has a reflecting surface which is obtained by aluminum vacuum deposition. Therefore, when a person observes the interior of the lamp through the lens, the reflector will glitter by the external light being reflected by a plurality of reflecting surface elements formed thereon. However, the aforementioned transparent cap, which is a transparent resin formed by injection molding, barely reflects external light, and therefore the transparent cap does not glitter. Hence, only the transparent cap appears significant as a lusterless block, not harmonious in design with the plurality of reflecting surface elements. Therefore, the lamp looks unattractive in external appearance when turned off.

One solution to the above problem is to cover the front end portion of the transparent cap with uneven reflecting boards. In this case, the transparent cap appears lustrous, and may be harmonious in design with the plurality of reflecting surface elements. That is, the external appearance of the lamp may be improved. However, this approach is disadvantageous for the following reasons.

When the lamp is turned on, the transparent cap does not shine at all, which makes the lamp unattractive in external appearance. In addition, for the same reason, the function of the transparent cap is not performed in that the direct light beam from the bulb is utilized for lamp light distribution. Thus, laying uneven reflecting boards over the front end portion of the transparent cap does not provide the desired solution to the problem.

SUMMARY OF THE INVENTION

In view of the previously discussed problems with other vehicle lamps, an object of the invention is to provide a vehicle lamp with a transparent cap which looks attractive in external appearance not only when the lamp is turned on but also when the lamp is turned off.

One embodiment of the present invention provides a vehicle lamp comprising a light bulb, a reflector having a plurality of reflecting surface elements which reflect light from the light bulb, a lens arranged in front of the reflector, a transparent cap attached to the reflector in such a manner as to cover the light bulb, and a light intercepting member near the front end portion of the transparent cap to intercept part of a direct light beam emitted forwardly from the light bulb. The front surface of the light intercepting member is formed into a plurality of light reflecting surface elements.

It will be apparent to those skilled in the art that the aforementioned light intercepting member may be a component which is separable from the transparent cap. Furthermore, it may be formed by painting or printing the outer surface of the front end portion of the transparent cap. Furthermore, the light intercepting member may be any one which is able to intercept part of the direct light beam emitted forwardly from the aforementioned light bulb. In other words, this invention can be practiced by using any suitable means for intercepting light beams without departing from the spirit or scope of the invention.

The front surface of the light intercepting member, which is formed into a plurality of light reflecting surface elements, may be substantially equal in luster to the reflecting surface elements of the reflector. If the light intercepting member is made from a material that does not have a luster that is substantially equal in luster to the reflecting surface elements of the reflector, the front surface of the light intercepting member can be surface-treated so as to have such a luster and thereby form a plurality of light-reflecting elements. Of course, if the light intercepting member is formed from a material that has a luster substantially the same as that of the reflecting surface elements of the reflector, the front surface of the light intercepting member forms a plurality of light reflecting elements without surface treatment.

The vehicle lamp of a presently preferred embodiment of the invention has a reflector with a plurality of reflecting surfaces, a transparent cap attached to the reflector in such a manner as to cover the light bulb, and a light intercepting member provided near the front end portion of the transparent cap to intercept part of the direct light beam emitted forwardly from the light bulb. The front surface of the light intercepting member is formed into a plurality of reflecting surface elements. In this preferred embodiment of the invention, the reflecting surface elements of the light intercepting member are formed by surface treatment. Hence, when the lamp is off and the interior of the lamp is observed through the lens, not only reflecting surface elements of the reflector but also the light intercepting member glitters when reflecting external light. In other words, the drawbacks of the transparent cap being a lusterless block are overcome by the present invention. By utilizing the approach taken in this invention, in which the above description is one embodiment thereof, the interior of the lamp will look lustrous in its entirety. That is, the transparent cap and the plurality of reflecting surface elements are harmonious in design with each other.

The above-described light intercepting member is so designed as to intercept part of the direct light beam emitted forwardly from the light bulb. Hence, although the front surface of the light intercepting member is formed into reflecting surface elements by surface treatment, the difficulty is eliminated that, when the lamp is turned on, the transparent cap does not shine at all. Hence, even when the lamp has been turned on, the lamp looks sufficiently attractive in appearance.

As was described earlier, the vehicle lamp with the transparent cap looks attractive in appearance not only when the lamp is turned on, but also when the lamp is turned off. Furthermore, according to the invention, the part of the direct light beam emitted forwardly from the light bulb and not intercepted by the light intercepting member may be used for lamp light distribution.

In the preferred embodiment, the light intercepting member is formed into a plurality of vertically extended, belt-shaped portions, or pillars, which are arranged at predetermined intervals, the light reflecting surface elements are in the form of vertical strips. In this embodiment the following effects are obtained: (1) When the interior of the lamp is off and the lamp is observed through the lens, the reflector and transparent cap look like glittering vertical stripes with external light being reflected by the reflector's reflecting surface elements and the belt-shaped portions. Therefore, the interior of the lamp appears uniform in design, which makes the lamp more attractive in appearance when the lamp is off; (2) When the lamp is on, the reflector looks like vertical glittering stripes reflecting light from the reflecting surface elements, while the transparent cap looks like vertical glittering stripes by the light beams which are emitted forwardly through the spaces between the belt-shaped portions. Hence, the whole interior of the lamp appears uniform in design and the lamp looks more attractive in appearance when the lamp is turned on.

One preferred embodiment further includes a Fresnel lens formed in an inner surface of the front end portion of the transparent cap, while the outer surface of the front end portion is formed into a plurality of lens steps which are in the form of vertical stripes and are equal in pitch to the above-described belt-shaped portions. In this embodiment, the portions of the direct light emitted forwardly from the light bulb and not intercepted by the belt-shaped portions or pillars can be controlled so as to be used for lamp light distribution.

The lens arranged in front of the reflector, or forward lens, may have lens steps, or it may not. In the case where the forward lens is a plain or substantially plain lens(i.e. a transparent or colorless lens), the interior of the lamp can be readily observed through the lens and therefore the formation of the vehicle lamp according to the invention is especially effective. Using a plain or substantially plain lens, however, is not essential to practicing invention, but rather an exemplary aspect of one embodiment.

In a preferred embodiment of the invention where the reflecting surface elements are in the form of vertical stripes, and the belt-shaped portions are also in the form of vertical stripes, the forward lens may have a plurality of leas steps which are in the form of horizontal stripes. In this case, the design of the forward lens, which is in the form of horizontal stripes, overlaps the design of the reflector and the transparent cap which is in the form of vertical stripes, so that resultant design of the lamp appears in the form of a grid.

The light intercepting member component may be formed separate from the transparent cap and it may also be formed separate from the reflector without departing from the scope or spirit of the invention. In a preferred embodiment, where the light intercepting member is integral with the reflector, the following merits are obtained. First, the manufacturing step of attaching the light intercepting member to the reflector is eliminated. Second, the surface treatment for forming the front surface of the light intercepting member into the reflecting surface elements, and the surface treatment for forming the reflecting surface elements on the reflector can be achieved at the same time. This will reduce the manufacturing cost of the vehicle lamp as much. In addition, the light intercepting member may be positioned with a high degree of accuracy.

Additional objects and advantages of the invention will be set forth in part in the description which follows, and in part will be obvious from the description. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of the following detailed specification, illustrate one embodiment of the invention and together with the description, serve to explain the principles of the invention.

SPECIFIC EMBODIMENTS OF THE INVENTION

It is understood that both the foregoing general description and the following detailed description are exemplary and explanatory only and are not restrictive of the invention as claimed.

Figure 1:
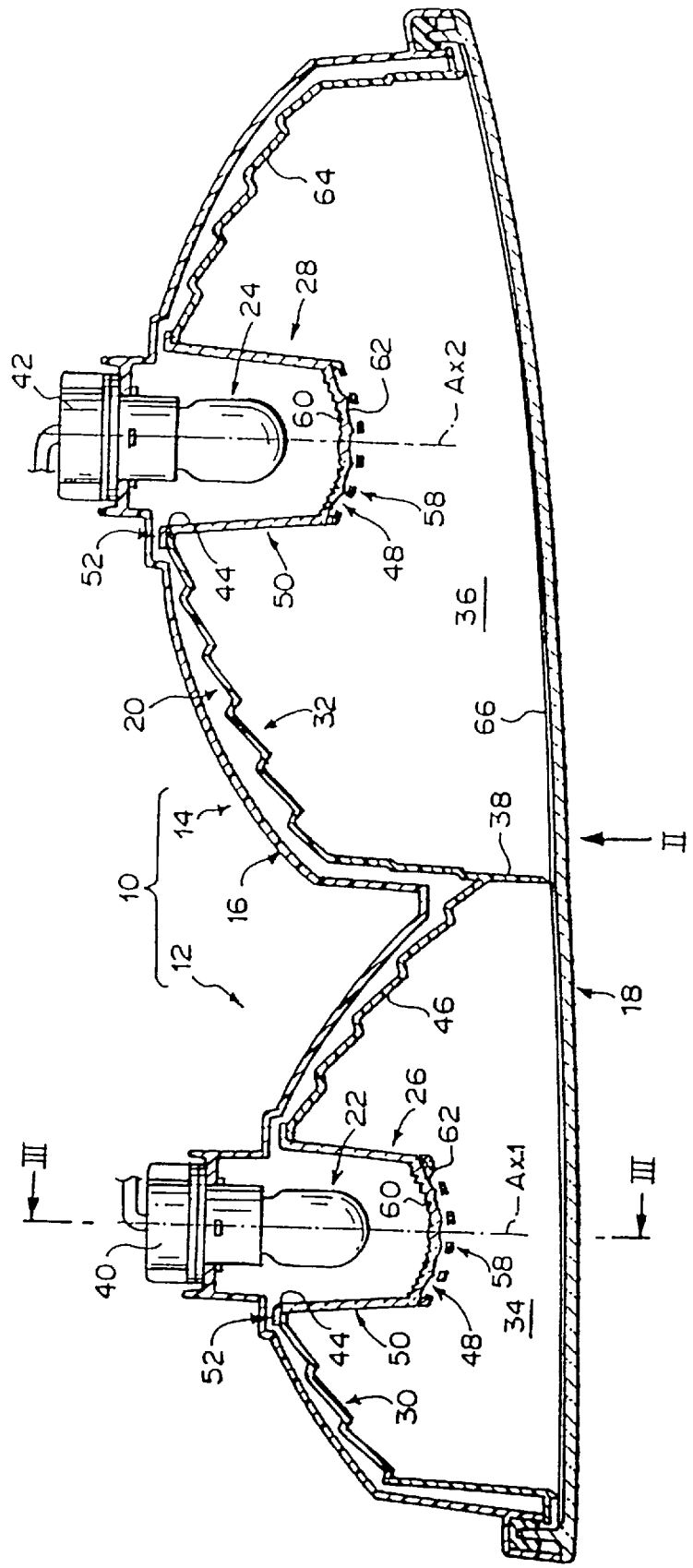
FIG. 1 is a sectional plan view of a preferred embodiment of the vehicle lamp.
Figure 2:
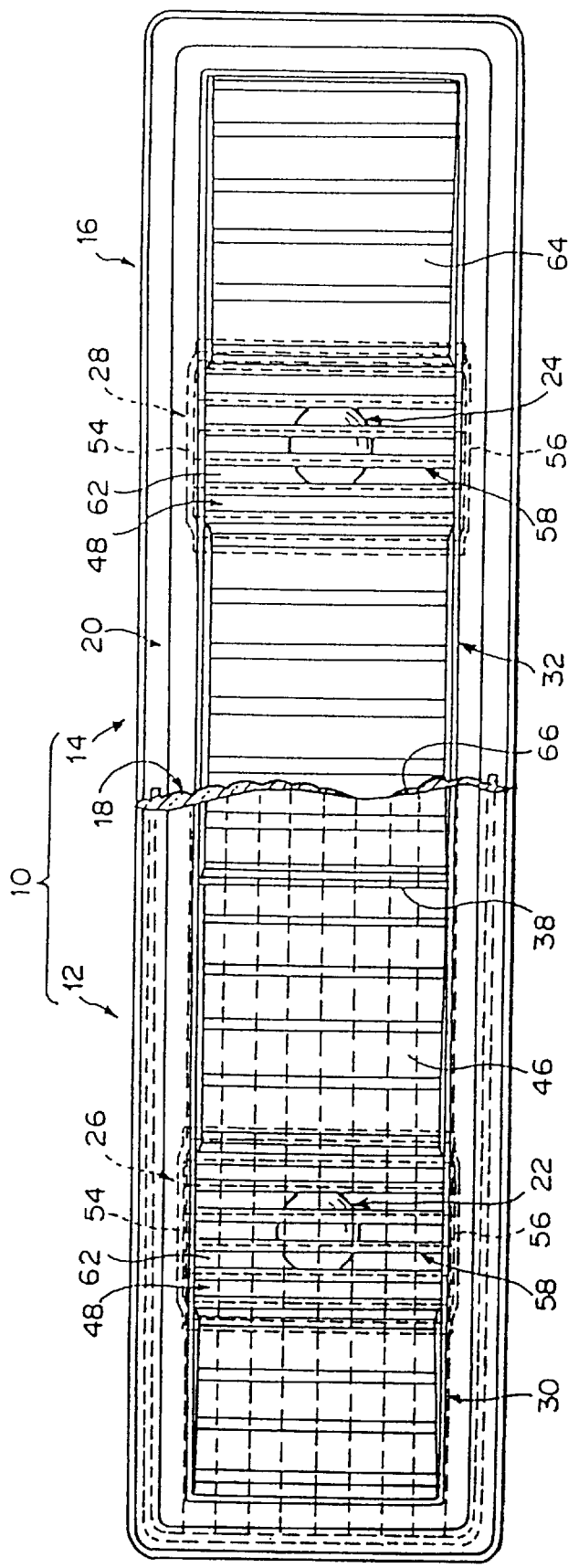
FIG. 2 is a view taken in the direction of the arrows substantially along line II—II in FIG. 1.
Figure 3:
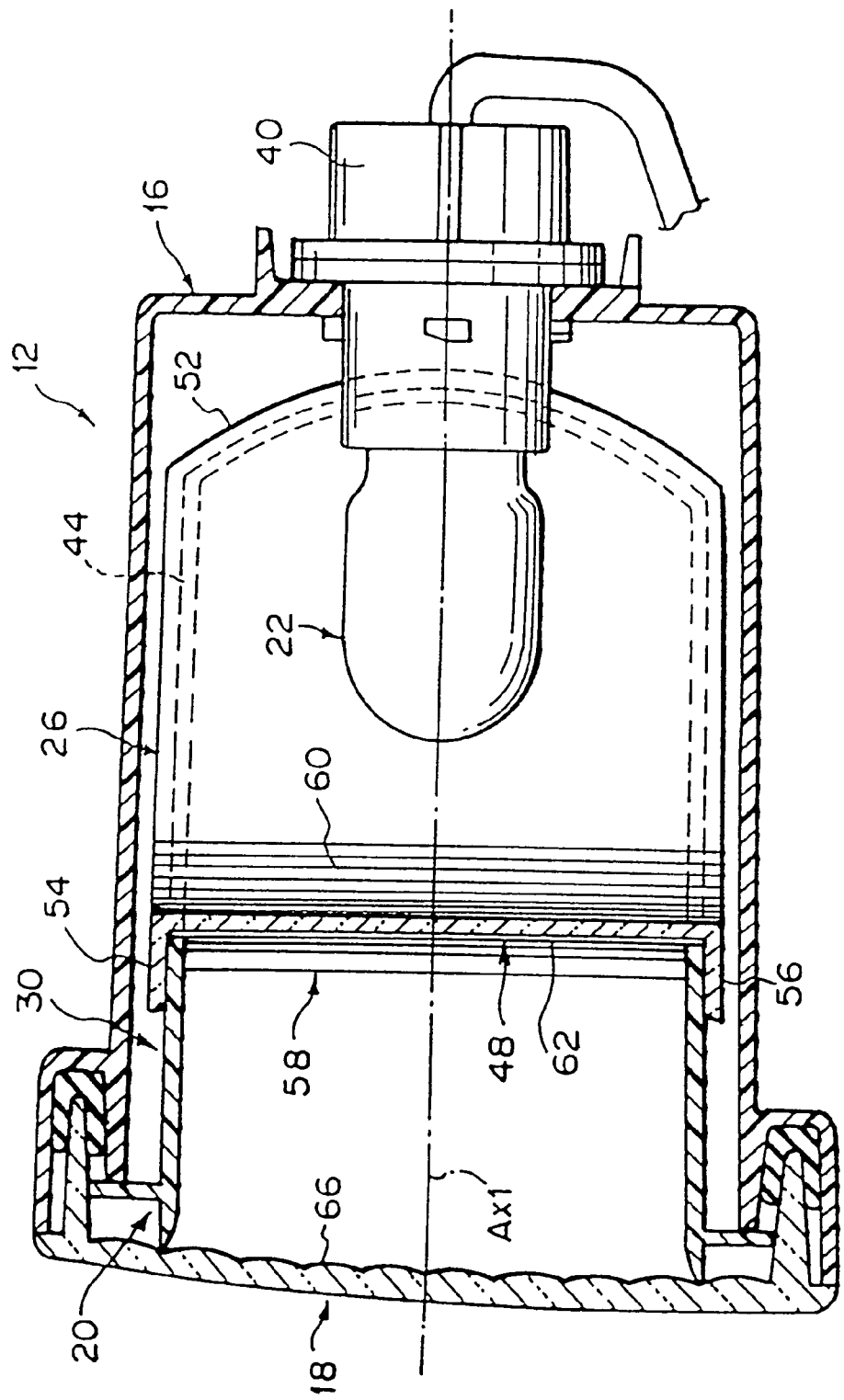
FIG. 3 is a sectional view taken along line III—III in FIG. 1.
Figure 4:
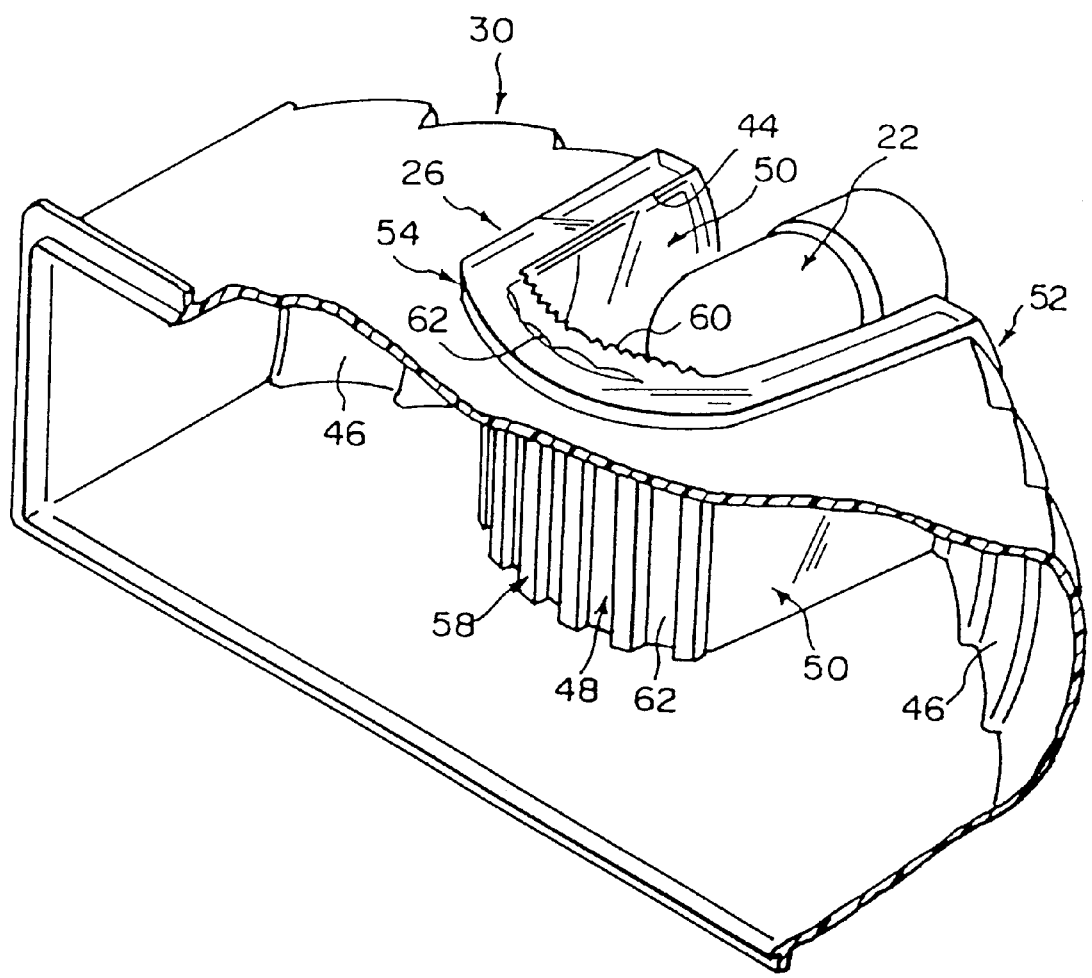
FIG. 4 is a perspective view a portion of the vehicle lamp in FIG. 1.

FIG. 1 is a sectional plan view showing a vehicle lamp, which constitutes a preferred embodiment of the invention. FIGS. 2 and 3 are sectional views taken in the directions of the arrows substantially along lines II—II and III—III in FIG. 1, respectively.

As shown in those figures, the embodiment of the vehicle lamp 10, is a rear combination lamp which is provided at the right rear end corner of a vehicle body, in which a backup lamp 12 and a turn signal lamp 14 are juxtaposed.

The rear combination lamp 10 comprises: a lamp body 16; a forward lens 18 arranged in front of the lamp body 16; a reflector panel 20 provided in the lamp chamber defined by the lamp body 16 and the forward lens 18; light bulbs 22 and 24 mounted on the lamp body 16 in such a manner that they are spaced at a predetermined distance from each other; and transparent caps 26 and 28 which are set in such a manner as to cover the bulbs 22 and 24, respectively.

The reflector panel 20 includes a reflector 30 for the backup lamp 12, and a reflector 32 for the turn signal lamp 14. The peripheral portions of those reflectors 30 and 32 are held by the lamp body 16 and the lens 18. At junction of the reflectors 30 and 32 of the reflector panel 20 is a partition wall 38 which divides the aforementioned lamp chamber into a backup lamp chamber 34 and a turn signal lamp chamber 36.

The bulbs 22 and 24 have optical axes Ax1 and Ax2, respectively, which are extended in the front-to-rear direction. The bulbs 22 and 24 are mounted on the lamp body 16 with the aid of sockets 40 and 42, respectively.

The backup lamp 12 and the turn signal lamp 14 are substantially equal in structure to each other. Therefore, for simplification in description, the construction of the backup lamp 12 will be described.

A cut 44 is made in the reflector 30 of the backup lamp 12 to accomodate the bulb 22. On the right and left sides of the cut 44 are a plurality of reflecting surfaces 46 adapted to diffuse and reflect light horizontally ("horizontally" meaning in a direction perpendicular to the optical axis Ax1 in FIG. 1). The reflecting surfaces 46 are arranged in such a manner as to appear as vertical-like strips, arranged horizontally and spaced at equal intervals from each other.

The transparent cap 26 is a molding of colorless transparent resin, substantially U-shaped in the plan view. The transparent cap 26 comprises: a front end portion 48 which is substantially cylindrical; a pair of vertical side walls 50; a pair of rear end flange portions 52; and an upper end flange portion 54 and a lower end flange portion 56 which are formed along the upper and lower ends of the vertical side walls 50 and the rear end flange portion 52. The transparent cap 26 is press-fitted in the cut 44 of the reflector 30 from the rear, so that it is fixedly secured to the reflector 30.

The cut 44 of the reflector 30 is U-shaped in a plan view in correspondence to the sectional plan view of the transparent cap 26. Along the front edge of the cut 44 of the reflector 30, a plurality of vertically-extending pillars 58 (i.e. extending into the plane of the drawing sheet FIG. 1) are provided in such a manner that they are arranged at equal intervals and integral with the reflector 30. More specifically, the pillars, 58 are arranged along the front end portion 48 of the transparent cap 26; i.e., they are arranged arcuately with their upper and lower ends secured to the upper and lower walls of the reflector 30, respectively. The front surfaces of the pillars 58 include reflecting surfaces 64, which may be formed by aluminum vacuum deposition, as in the case of the reflecting surface elements 46.

The inner surface of the front end portion 48 of the transparent cap 26 is a Fresnel lens 60 which extends vertically. In addition, on the outer surface of the front end portion 48, a plurality of lens steps 62 are formed which are divided like vertical stripes. The lens steps 62 are made up of inwardly curved cylindrical lenses, and they are equal in pitch to the pillars 58; more specifically, the lens steps 62 border lines are located behind the pillars 58. In the transparent cap 26, the direct light beam applied from the bulb 22 to the front end portion 48 is converted by the Fresnel lens 60 into a horizontal parallel light beam, and the latter is converted into a horizontal diffusion light beam which is emitted forwardly.

The reflector 32 of the turn signal lamp 14 is identical to the backup lamp with the following minor exceptions: the arrangement and spacing of the reflecting elements 32 are slightly different from the reflecting elements 30, as shown in FIG. 1. Moreover, the transparent cap 28 of the turn signal lamp 14 is an amber color whereas the transparent cap 26 is colorless.

The inner surface of the forward lens 18 is formed into a plurality of lens steps 66 which are arranged like horizontal stripes at equal intervals. The lens steps 66 are outwardly curved cylindrical lenses.

The function of a preferred embodiment will now be described.

In the backup lamp 12, the transparent cap 26 is attached to the reflector 30 having a plurality of reflecting surface elements 46 in such a manner that it covers the bulb 22. Near the front end of the transparent cap 26, a plurality of pillars 58 are provided which function as light intercepting members adapted to intercept part of the direct light beam emitted forwardly from the bulb 22. Furthermore, on the front surfaces of the pillars 58 are reflecting surfaces 64 formed by aluminum vacuum deposition. Hence, when the lamp is off and the interior of the lamp is observed, not only the reflecting surface elements 46 formed on the reflector 30 but also the reflecting surfaces 64 of pillars 58 glitter when reflecting external light. This feature overcomes the drawback that only the transparent cap appears as lusterless block. That is, the interior of the lamp looks lustrous in its entirety, and the transparent cap 26 is harmonious in design with the plurality of reflecting surface elements 46 of the reflector 30.

The above-described pillars 58 intercept only part of the direct light beam emitted forwardly from the bulb 22. Hence, although the pillars 58 are light intercepting members, a portion of the light beams emitted from the bulb will pass through the front portion 48, allowing the transparent cap 26 to shine. Hence, even when the lamp has been turned on, the lamp looks sufficiently attractive in appearance.

As was described above, the backup lamp 12 with transparent cap 26, as described by the invention, looks attractive in appearance not only when the lamp is turned on, but also when it is turned off. Furthermore, the part of the direct light beam from the bulb 22 which passes through the transparent cap 26 and which is not intercepted by the pillars 58 may be employed for lamp light distribution.

In one preferred embodiment, a plurality of reflecting surface elements 46 are arranged like vertical stripes, and a plurality of vertically extended pillars are arranged in a horizontal direction at equal intervals. This feature provides the following effects: When the lamp is off and the interior of the lamp is observed through the forward lens 18, the reflecting surface elements 46 and the reflecting surfaces 64 of the pillars 58 will glitter when reflecting external light. Therefore, the interior of the lamp appears uniform in design, which makes the lamp more attractive in appearance. On the other hand, when the lamp is on, the reflector 30 looks like vertical glittering stripes reflecting light from the reflecting surface elements 46, while the transparent cap 26 looks like vertical glittering stripes by the light beams which are emitted forwardly through the spaces between the pillars 58. Hence, the whole interior of the lamp feels uniform in design and more attractive in appearance when the lamp is turned on.

Furthermore, the inner surface of the front end portion 48 of the transparent cap 26 is formed into a Fresnel lens 60 which is vertically extended, and the outer surface of the front end portion are formed into a plurality of lens steps 62 which are in the form of vertical stripes and are equal in pitch to the pillars 58. Hence, the part of the direct light beam emitted forwardly from the bulb but not intercepted by the pillars 58 may be controlled so as to be used for lamp light distribution.

Moreover, in the preferred embodiment, the forward lens 18 has a plurality of lens steps 66 which are in the form of horizontal stripes. Hence, by laying the design of the lens steps 66 which are in the form of horizontal stripes over the design of the reflector 30 and the transparent cap 26 which is in the form of vertical stripes, the resultant design of the lamp appears in the form of a grid. In addition, with the aid of the lens steps 66, the horizontal reflection and diffusion of light beams from the reflecting surface elements 46 of the reflector 30 can be also be diffused vertically. Hence, a light distribution performance can be readily obtained as required.

In the preferred embodiment, the pillars 58 are integral with the reflector 30. Hence, it is unnecessary to provide a manufacturing step of attaching the pillars 58 to the reflector. Moreover, the step of forming the front surfaces of the pillars 58 into reflecting surfaces 64, and the step of forming the surfaces of the reflecting surface elements 46 of the reflector 30 can be achieved at the same time, thus further reducing the lamp manufacturing costs. In addition, the pillars 58 can be positioned with a high degree of accuracy.

The construction of the turn signal lamp 14, according to the present invention, is substantially the same as the construction of the backup lamp 12. Therefore, the above-mentioned manufacturing advantages apply equally to both the turn signal lamp 14 and the backup lamp 12.

Figure 5:
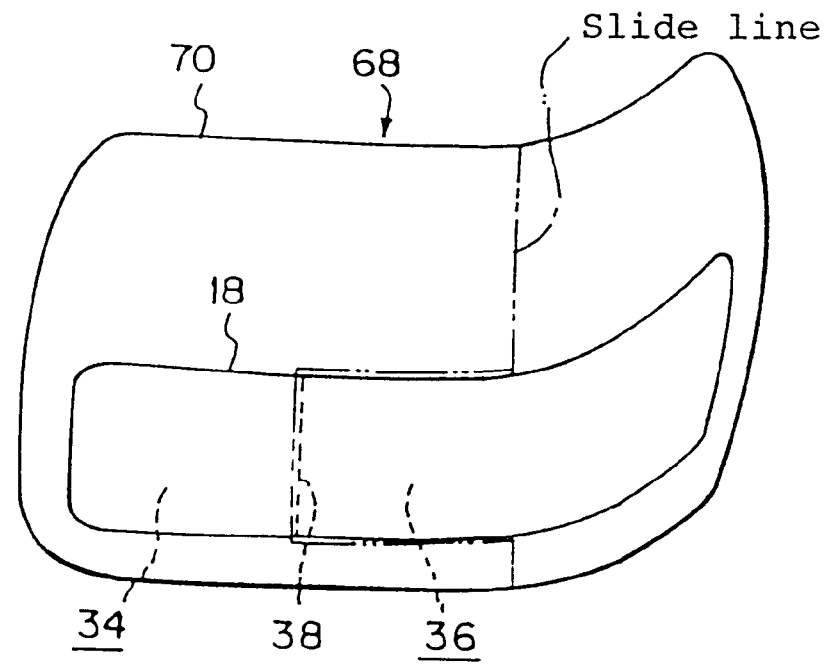
FIG. 5 is a perspective view showing a second embodiment of a vehicle lamp.

In the above-described embodiment, the backup lamp 12 and the turn signal lamp 14 are juxtaposed to form the rear combination lamp 10; however, the technical concept of the invention may be equally applied to a lamp which is merely made up of only a backup lamp 12 or a turn signal lamp 14, or to a rear combination lamp 68 which, as shown in FIG. 5, comprises a backup lamp 12, a turn signal lamp 14, and an additional lamp (such as a tail lamp).

Figure 6:
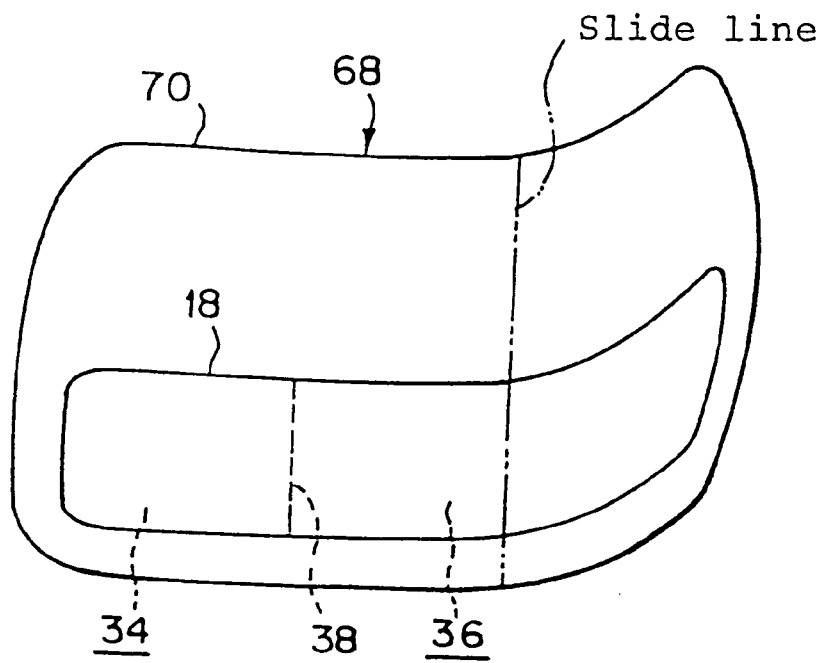
FIG. 6 is a perspective view showing a comparison example of the modification shown in FIG. 5.

As shown in FIG. 5, in a rear combination lamp 68 in which the end portion thereof is extended towards the front of the vehicle body, its lens 70 is of a slide type, and the inner surface of the lens 70 has a slide line. In general, the slide line, as shown in FIG. 6, is a substantially straight line which is extended vertically near the corner. In this case, the slide line looks like a scratch formed in the inner surface of the lens 70. In order to overcome this difficulty, the metal mold is so modified that, as indicated by the two-dot chain line in FIG. 5, the middle part (positioned over the lens 18) of the slide line is horizontally moved to the border line (corresponding to the position of the partition wall 38 on the inner surface of the lens (cf. FIG. 1)) between the backup lamp chamber 34 and the turn signal lamp chamber 36. In this case, the slide line is not noticeable; that is, the appearance of the lamp is improved.

Other embodiments of the invention will be apparent to those skilled in the art from consideration of the specification and the practice of the invention disclosed herein. It is intended that the specification and examples be considered as exemplary only, with a true scope and spirit of the invention being indicated by the following claims.

What is claimed is:

1. A vehicle lamp, comprising:

a light bulb;

a reflector which reflects light from said light bulb;

a forward lens arranged in front of said reflector;

a transparent cap attached to said reflector in such a manner as to cover said light bulb without covering a substantial part of said reflector, wherein said transparent cap includes a front end portion; and a light intercepting member disposed in front of the front end portion of said transparent cap, said light intercepting member intercepting part of a direct light beam emitted forwardly from said light bulb and including a light reflecting surface for reflecting external light forwardly from said front end portion.

2. The vehicle lamp of claim 1, wherein said reflector includes a plurality of reflecting surface elements.

3. The vehicle lamp of claim 1, wherein said light reflecting surface is formed on a surface of said light intercepting member that is opposite said light bulb.

4. The vehicle lamp of claim 3, wherein said light reflecting surface includes a plurality of light reflecting elements formed on said surface of said light intercepting member.

5. The vehicle lamp of claim 4, wherein said light intercepting member has a plurality of vertically extended pillars which are arranged at predetermined intervals and said plurality of light reflecting surface elements are in the form of vertical stripes.

6. The vehicle lamp of claim 5, wherein an inner surface of said front end portion of said transparent cap is formed into a Fresnel lens and an outer surface of said front end portion of said transparent cap is formed into a plurality of lens steps which are in the form of vertical stripes arranged at the same pitch as said pillars.

7. The vehicle lamp of claim 6, wherein the forward lens includes a plurality of lens steps which are in the form of horizontal strips.

8. The vehicle lamp of claim 6, wherein said light intercepting member is integral with said reflector.

9. The vehicle lamp of claim 5, wherein the forward lens has a plurality of lens steps which are in the form of horizontal stripes.

10. The vehicle lamp of claim 9, wherein said light intercepting member is integral with said reflector.

11. The vehicle lamp of claim 5, wherein said light intercepting member is integral with said reflector.

12. The vehicle lamp of claim 1, wherein said light intercepting member is integral with said reflector.

13. The vehicle lamp of claim 1, wherein said light reflecting surface is formed from a lustrous material.

14. The vehicle lamp of claim 2, wherein said light reflecting surface is formed by Vacuum deposited Aluminum.

* * * * *